Patented May 17, 1938

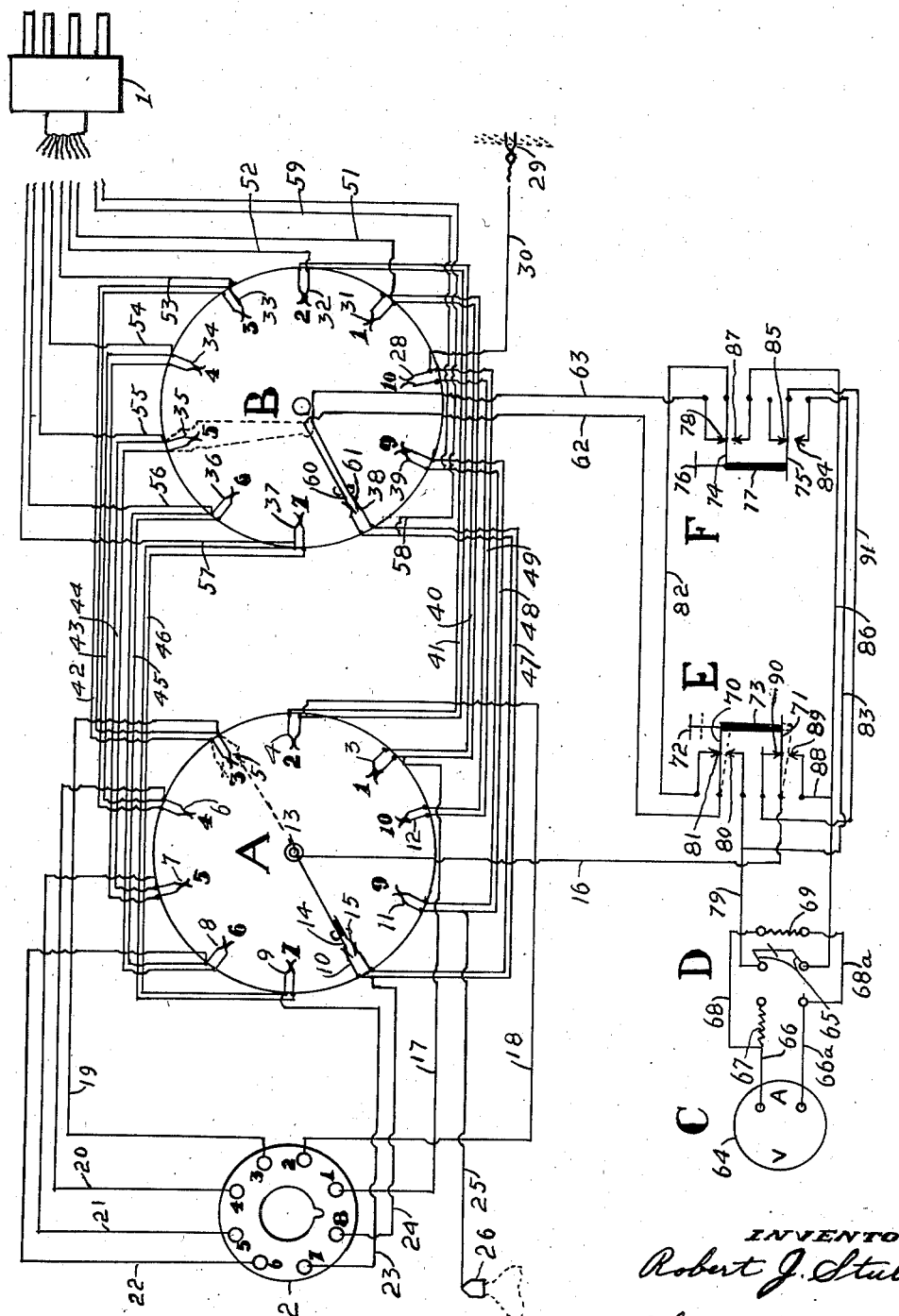

2,117,582

UNITED STATES PATENT OFFICE 2,117,582

ELECTRICAL CIRCUIT TESTER

Robert J. Stull, San Francisco, Calif.

Application October 12, 1935, Serial No. 44,677

4 Claims. (Cl. 250—27)

The present invention relates more particularly to means for testing the electrical circuits of radio sets, switch boards, telephone boards, sound equipment, etc.

In the testing and analyzing of electrical circuits such as found in a radio receiving set, for instance, it has heretofore been necessary to use various units of testing equipment to measure electrical values of various sorts.

Furthermore, in using analyzers of the character indicated it has heretofore been necessary to effect a number of adjustments, such as the setting of jumper wires, for testing the several circuits of a radio set.

The result is that a complete equipment for conducting the several tests that may have to be made is costly, and the conducting of the tests themselves is a time consuming process.

It is one object of the present invention to provide an analyzing and testing device that combines in one compact unit means for effecting all of the tests desired without the use of jumper wires and without the necessity of effecting any adjustments other than the manipulation of a few simple switches.

It is also an object of the invention to provide means of the character indicated that will be economical to manufacture, simple in form and construction, accurate and positive in operation, and highly efficient in its practical application.

The drawing is a diagram of one specific embodiment of the invention as applied to one tube socket of a radio receiving set.

The device disclosed in the diagram is self contained, the only outside connection made being that of the plug 1 which is inserted in the selected socket of the radio set, the socket 2 being a counterpart of the radio socket. Obviously, in a commercial device a number of sockets as 2 are provided to accommodate tubes having a varying number of prongs, and adapters having varying numbers of prongs are provided for the plug 1 but the invention is completely disclosed as applied to but one socket.

In the present case the socket 2 is adapted to receive an eight pronged tube, the terminals and seats for the several prongs being numbered from 1 to 8 to conform to the standard method of tube socket designation.

The principal parts of the device are the selector switch A, the selector switch B, the meter C with its controlling switch D, and push button switches E and F.

In the present instance the switch A comprises a row of ten pairs of normally contacting but separable terminals as 3 to 12 inclusive arranged about a pivotal point 13.

At 14—15 is a pair of spaced terminals insulated from each other and movable in a fixed path of travel so as to successively pass between and separate the several pairs of terminals above referred to.

When the terminals 14—15 are moved into position between any one pair of terminals 3 to 12 they make electrically conducting contacts with the two parts thereof, but since terminal 15 is without electrical connections it makes a break in the electrical circuit including the terminal with which it makes contact, while the terminal 14 puts the terminal with which it makes contact into an electrical circuit including wire 16 having connections hereinafter described.

One side of each pair of terminals 3 to 10 is connected by a wire as at 17 to 24 inclusive to a terminal bearing a corresponding socket number on the socket 2, while one side of the pair of terminals 11 is connected by a wire 25 to a tube tip part 26, and both sides of the pair of terminals 12 are connected by wires 49 to the corresponding pair of terminals 28 on selector switch B.

The selector switch B is identical with the switch A, the corresponding pairs of terminals being indicated at 28 and 31 to 39, the corresponding pairs of terminals being connected by pairs of wires as at 40 to 49 inclusive.

Each of the last named pairs of terminals 31 to 39 is also connected by a wire as 51 to 59 inclusive to the plug 1, but the connections to these terminals are on the opposite side to the connections of the wires 17 to 24 on terminals 3 to 10. Terminal 28 connects to a ground clip 29 by wire 30.

This selector switch B is also provided with a pair of spaced terminals 60—61 insulated from each other and movable in a fixed path of travel so as to successively pass between and separate the several pairs of terminals 28 and 31 to 39. The terminals 60 and 61 are connected by wires 62—63 to certain control devices hereinafter described.

It may be readily seen from the foregoing that when the plug 1 is inserted in a socket of a radio set identical with the socket 2, and the tube from the set placed in the socket 2, the radio set, with the tube, will be connected in a perfectly normal manner because the tube is connected in the set the same as before but is wired through the analyzer.

Taking the wire 51, for instance, it leads from the plug 1 to one side of the pair of terminals 31.

These terminals are connected by wires 40 to the pair of terminals 3, the latter being connected as described to terminal "1" on the socket 2.

The meter C, its control switch D, and the two switches E and F are connected to the selector switches A and B through the medium of wires 16, 62 and 63 in the following manner.

In the commercial device I provide a meter 64 with scales for reading volts, amperes, resistance, etc., in all some twenty-three different scales and units, but only the measurement of volts and amperes is indicated in this disclosure.

Any suitable type of selector switch may be used, but since the meter as disclosed reads only for volts and amperes I show a double pole two-throw switch at 65. One side of the switch is connected to the meter by wires 66—66a through voltage resistor 67, and the other side is connected to the meter by wires 68—68a, with shunt 69 for the ammeter, and wires 66—66a. By this means the meter may be caused to read either volts or amperes.

The push button switch E comprises a pair of spaced and parallel spring strips 70, 71 operated simultaneously in the same direction by a button 72 and a spacing member of insulating material 73, and the push button switch F comprises a pair of spaced and parallel spring strips 74, 75 operated in the same direction, and simultaneously, by a button 76 and a spacing member of insulating material 77.

The wire 62 is connected to the spring strip 70, while the wire 63 has a terminal 78 normally contacting with the spring strip 74, and the wire 16 is connected to the spring strip 71.

One side of the adjustable element of switch 65 is connected by wire 79 to a terminal 80 normally spaced from spring strip 70 and in opposed relation to terminal 81 normally contacting strip 70. Terminal 81 is connected by wire 82 to spring strip 74.

The wire 79 is connected by a wire 83 to a terminal 84 normally spaced from the spring strip 75 and in opposed relation to a terminal 85 normally contacting said strip and without electrical connections.

The other side of the adjustable element of switch 65 is connected by wire 86 to a terminal 87 normally spaced from spring strip 74 in opposed relation to terminal 78. The wire 86 is connected to a terminal 89 by wire 88, the said terminal being normally spaced from the spring strip 71 in opposed relation to a terminal 90 which is normally in contact with strip 71 and is connected by wire 91 to strip 75.

By means of this arrangement the circuits controlled by the switches E and F are normally open, and the switches A, B and D may be operated at will without danger of opening any circuit to the tube and without danger of short circuiting any two circuits of the tube.

With the switch 65 closed either switch E or F may be operated to close the circuits to A and B to obtain a reading. The two switches E and F perform the same function, that is, they connect the meter so it will read, and are so connected that if the meter does not read correctly when one is closed it will be correct when the other is closed, as in this case the connections to the meter are reversed.

To measure an electrical quantity between two different points in a tube (as for instance plate voltage, measured from plate to cathode) one switch, as A, is set to plate and the other, B, to cathode, and the meter switch is set to the proper scale and one switch, as E, is closed. If the meter reads backwardly this switch is opened and the other switch, F, is closed and the meter will then read correctly.

As a concrete example of the operation of the device for measuring voltage, let it be assumed that the plug 1 has been inserted in the socket of the radio set to be tested and the tube from said socket placed in socket 2, and that it is desired to measure the voltage as between "3" and "5" in socket 2. Set the selector switch A to "3" at 5 and selector switch B to "5" at 35. Set the meter switch D to volts and press E. With these settings the circuit through the meter is from "3" through 19, 5, 14, 16, 71, 89, 88, 86, 65, 66a, 64, 66, 67, 65, 79, 80, 70, 62, 60, 35, 44, 7, 21, to "5". Any other circuit, including the tube tip circuit 26 and ground circuit 29 may be tested in like manner.

To measure an electrical quantity in a single circuit, as for instance plate current in a radio tube, both switches A and B are set to the plate terminal, the meter switch is set to the proper current scale, and one switch as E is closed.

As one concrete example of the operation of the device for measuring current, let it be assumed that the plug 1 has been inserted in a socket of the radio set to be tested, and the tube from said socket placed in socket 2, and that it is desired to measure the current flowing in tube circuit "8".

The switch 65 is closed to the proper ampere scale in making such a test, the terminals 14, 15 are moved into position between terminals 10, and terminals 60—61 are moved into position between terminals 38. The push button switch E is now operated, thereby breaking contact at 90 and making contact at 89. The meter is now in series with the tube circuit "8" which may be traced from "8" through 24, 10, 14, 16, 71, 89, 88, 86, 65, 68a, 66a, 64, 66, 68, 65, 79, 80, 70, 62, 60, 38, 58, to plug 1. 69 is the current calibrating shunt across the meter 64.

With the meter showing all desired units and scales it may be used in connection with either A. C. or D. C. circuits and for measuring various sorts of electrical values such as plate voltage, plate current, screen voltage, resistance, capacity, etc., either between any two circuits or in series with any one circuit, merely by proper adjustment of switches A, B and D, and then closing either switch E or F.

Two push button switches E and F are provided, one to read direct and the other reversed in case the meter is connected backwards, and these are so connected with the selector switches A and B that whenever the two selectors are on differently numbered points, as for voltage reading, the circuit is open until a push button switch is operated. This prevents short circuiting any two different circuits while setting the selectors. On the other hand, when the two selectors are on the same socket numbers (as when reading currents) the circuit so set to is not opened, nor the meter connected, until either push button switch is operated. This prevents opening of any circuit while setting the selectors before the push button switch is operated.

While the foregoing specification refers particularly to the testing of radio tube socket circuits, the device may be applied to any electrical assembly wherein there are two or more circuits to be tested, suitable substitutions being made for the plug 1 and socket 2.

It is to be understood, of course, that while I have herein shown and described but one specific embodiment of the invention, changes in form, construction, and method of assembly and operation may be made within the scope of the appended claims.

I claim:

1. A testing device of the character indicated comprising, a plug for a tube socket, a socket adapted to receive a tube pronged similarly to the plug, a pair of normally-closed multipoint, single arm selector switches, and each two corresponding switch-point elements of the said pair of switches being connected in a normally closed circuit, each circuit being connected in series with corresponding terminals in said socket and plug, and a meter circuit controlled by switches selectively associated with both of said selector switch arms whereby said meter circuit may be inserted in any one or more of the first named circuits.

2. A testing device of the character indicated comprising, a plug for a tube socket, a socket for a tube pronged similarly to the plug, tube circuits connecting corresponding terminals of the plug and socket, a meter circuit, a pair of multipoint, single arm, selector switches operable to connect the meter circuit in any one or two of the tube circuits, said meter circuit having two switches inserted therein to cause the current to flow in either direction through said meter.

3. A testing device for electrical circuits comprising, a switch controlled meter circuit, multipoint single arm, switch controlled selector circuits arranged in series with connections for the circuits to be tested, a pair of switches in the meter circuit with connections for directing the flow of current in either direction through said meter, and connections from the last named switches to the arms of the multipoint switches whereby the meter circuit may be connected between any two selector circuits or in any one of the selector circuits.

4. A testing device of the character indicated comprising, a plug for a tube socket, a socket for a tube pronged similarly to the plug, tube circuits connecting corresponding terminals of the plug and socket, a meter circuit having a meter inserted therein, and a pair of multipoint, single arm switches inserted in the tube circuits and connected to the meter circuit whereby the meter can be connected in parallel between any of the several circuits of the tube or may also be connected in series with any circuit of the tube.

ROBERT J. STULL.